United States Patent Office 3,356,552
Patented Dec. 5, 1967

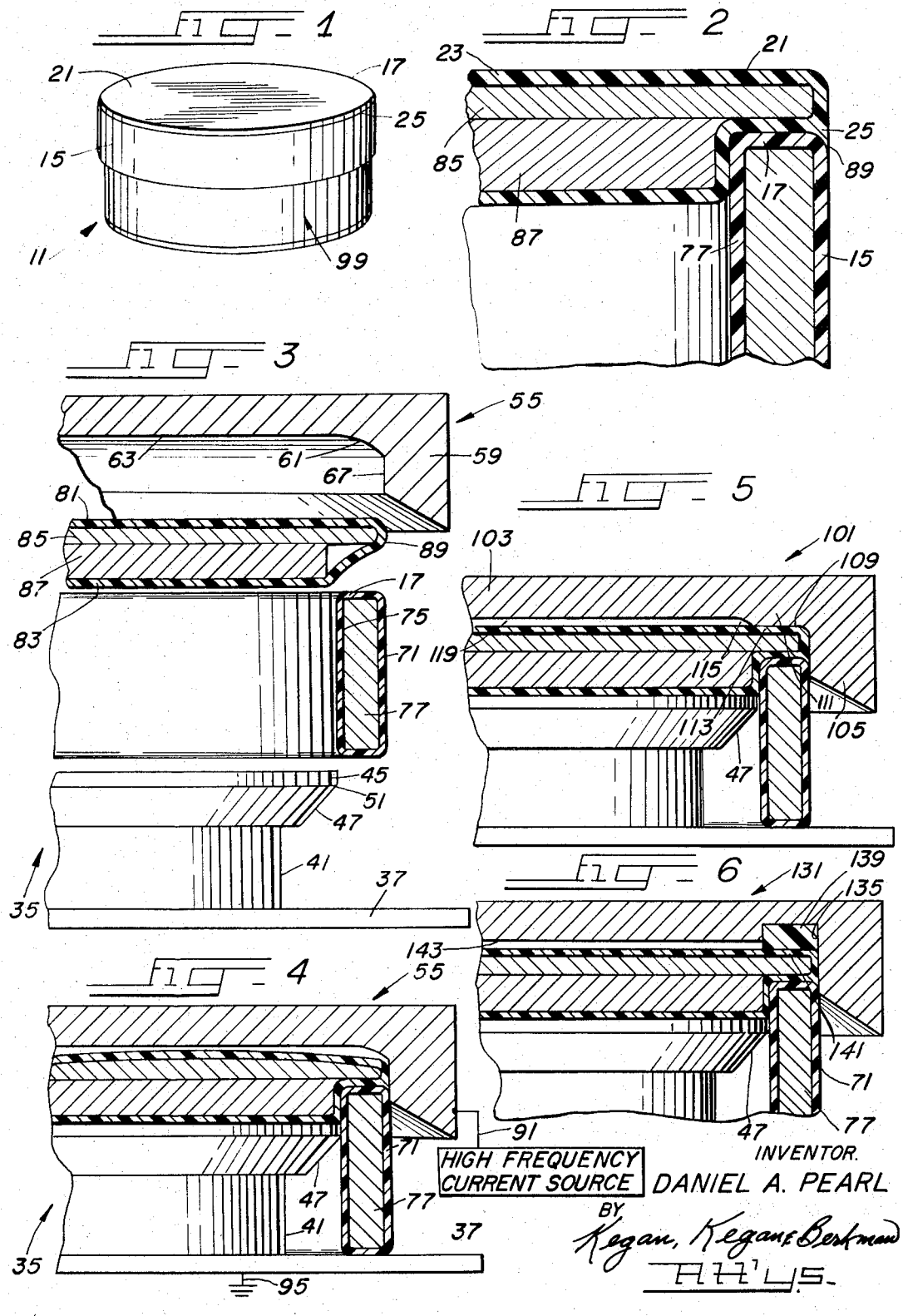

3,356,552
METHOD AND APPARATUS FOR HEAT SEALING A FREE MARGINAL EDGE OF AN UPSTANDING COLUMNAR WALL TO A PERIPHERAL EDGE
Daniel M. Pearl, Skokie, Ill., assignor to Sealatron Corporation, Chicago, Ill., a corporation of Illinois
Filed Apr. 19, 1965, Ser. No. 449,198
6 Claims. (Cl. 156—69)

This invention relates generally to improvements in the method of fabricating portable containers such as hatboxes, shoeboxes, toiletry and cosmetic cases and the like. More particularly, the invention is directed to an improved method and apparatus for fusing and bonding intersecting portions of thermoplastic wall structures comprising elements of the containers of the invention. Specifically, the invention is directed to apparatus and a technique for producing a smooth thermoplastic seal, weld, or fusion bond between abutting edges of an upstanding wall and a bridging cross-wall of portable plastic containers and carrying cases.

In typical applications the present invention finds utility in the fabrication of containers constituting a pair of tray-like elements each comprising a columnar side wall and a spanning cross-wall, the side wall and cross-wall being joined to each other at contiguous peripheral edge portions through thermal fusion. In general, one of the tray-like elements is deeper than the other and constitutes the body proper of the container while the shallower of the two elements constitutes the top or a closure member for the container. The general fabrication and internal construction of such containers are described in co-pending application Ser. No. 392,482, filed Aug. 27, 1964, and the entire disclosure of that application is specifically incorporated herein by reference, to the extent that it is not inconsistent herewith.

Various techniques, arrangements, and forms of cooperating high-frequency system electrodes have been utilized in the prior art in achieving a seal or a fusion bond between an upstanding wall and a bridging or spanning cross-wall of tray-like components or elements. For example, one prior art method involves the use of a planar platen-like top electrode and a mandrel or box-like bottom electrode, the latter being of substantially the same height as the upstanding wall of the plastic tray element. The upstanding wall of the tray component is enclosed in the mandrel-like electrode and a marginal edge portion of the plastic wall material is positioned to extend above and over to cover the top edge of the mandrel electrode. A corresponding edge portion of the spanning cross-wall is superimposed in contiguous relationship with the peripheral portion of the upstanding wall and the top electrode is then positioned to overlie the mandrel electrode so that, upon electrical energization, the contiguous portions of the walls fuse to form a continuous horizontal seal. The above fabricating technique gives rise to a laterally extending circumferential or annular lip which is objectionable for certain applications. Moreover, a sharp edge is often produced necessitating further trimming and treatment. Another prior art technique is to effect a seal through the utilization of a top electrode having a downwardly diverging and concave or arcuate inner face which presses tangentially against adjacent contacting edges of the upstanding and the spanning wall to form a seal at the curved surface of the electrode. Although this contour seal technique eliminates the objectionable lip, use of the curved sealing surface gives rise to other problems such as uncertainty of positive abutment and weakness in the final joinder. It is, thus, the aim of the present invention to eliminate the objectionable features and shortcomings of prior art apparatus and techniques and to provide an improved heat sealing electrode system in which corresponding peripheral edge portions of plastic walls to be joined are brought into firm and positive stressed contact or abutment along a vertical wall portion of an annularly disposed electrode element.

It is a principal object of the invention to provide an improved apparatus and sealing technique in which a straight-walled electrode is utilized to bring peripheral edge portions of a thermoplastic sheet into vertical abutment and into lateral correspondence and registry with a columnar plastic wall to effectuate a smooth high-strength seal at firmly and positively contacting edge portions of the peripheral wall and the spanning wall while urging these peripheral portions in stressed abutment against one another.

It is another object of this invention to provide an apparatus and technique for effecting a seal between an overlying plastic sheet and a supporting tubular plastic sheet and in which the locus of the seal is adjacent but somewhat vertically displaced from the top surface of the overlying plastic sheet.

Another object of the invention is to provide an improved sealing electrode having a non-metallic element for urging the peripheral portion of a cross wall against a corresponding edge of an upstanding wall.

Still another object of the invention is to provide a smooth butt seal of increased strength and improved over-all appearance.

A related object of the invention is to provide an improved pair of cooperating electrodes forming part of an electronic welding machine for thermoplastic sheet material and uniquely adapted to seal together peripheral edges of intersecting transversely extending walls.

Other and further objects and advantages will become apparent from a reading of the following specification taken in conjunction with the drawings in which:

FIGURE 1 is a perspective view of a portable container with wall seals made in accordance with the teachings of the invention.

FIGURE 2 is an enlarged fragmentary vertical sectional view showing the spatial relationship of the abutting plastic walls of the container and the smooth side seal joining the walls.

FIGURE 3 is an exploded view in vertical section and showing the transversely disposed plastic walls and the cooperating upper and lower sealing electrodes.

FIGURE 4 is a vertical sectional view showing the top and bottom electrodes in sealing position and the peripheral edges of the transversely disposed plastic walls confined therebetween.

FIGURE 5 is a similar to FIGURE 4 but illustrates another preferred embodiment of the top electrode.

FIGURE 6 illustrates still another preferred embodiment of he top electrode.

The aims, objects and advantages of the invention are accomplished by providing a pair of cooperating electrodes including a canister-like bottom electrode having a top horizontally extending platen or wall portion which supports and urges the columnar plastic wall radially outwardly and into contact with a flat inner face of a depending vertical flange of an overlying top electrode, the latter serving to urge the bounding peripheral portion of an overlying plastic sheet into vertical abutment with a registering peripheral edge of the upstanding columnar wall plastic sheet. The upper and lower electrodes coact and cooperate to maintain the two wall components resiliently stressed in firm abutment during the application of high frequency sealing current.

Referring now to the drawing, and particularly to FIGURES 1 through 4, for purposes of disclosure, the invention will be described with reference to the fabrication of an open-ended receptacle 11 which constitutes a component or element of the final container, case, or enclosure. The finished receptacle 11 as illustrated in FIGURE 1 includes an upstanding columnar wall 15 which is integrally fused at its upper peripheral edge 17 to a spanning thermoplastic sheet 21 having a contour corresponding to the cross-sectional configuration of the columnar wall 15. As clearly illustrated in FIGURE 2, the seal or fusion bead or band 25 of the transversely extending walls 15 and 21 is effected not precisely along the transverse intersection of these walls and not along a radial juncture of these walls, but along an annular line extending in a horizontal plane which parallels the plane defined by the upper surface 23 of the spanning sheet 21 but is spaced from that plane. That is, the seal 25 is at the side wall of the receptacle 11 at the juncture between the upper edge 17 of the columnar wall 15 and a downwardly urged or pressed peripheral edge portion of the spanning plastic sheet 21. The simple and highly effective steps by which this improved seal is achieved will become evident as the description proceeds.

The lower electrode 35 (FIGURE 3) of the sealing assembly of the invention constitutes a canister which comprises a generally horizontal bottom plate or platen 37, a vertically disposed upstanding annular wall 41 supported on the base 37, and a generally horizontally disposed upper plate or platen 45 surmounting and supported on the annular wall 41 and extendnig radially beyond the circumferential diametric limits of the annular wall 41. In a preferred embodiment of the invention, and as illustrated schematically in FIGURE 3 the peripheral portion of the upper platen or plate 45 is cut away to form an inwardly and downwardly extending face 47 and a well-defined terminal edge 51 which enhances the directivity of the electrode system in the wall sealing or joining operation.

The upper electrode 55, as illustrated in a preferred embodiment of FIGURES 3 and 4, comprises a sealing dish or pan having a downwardly extending straight depending annular wall 59 blending at its upper inside vertical surface through a curved portion 61 into a generally flat horizontal surface 63. A most significant and important feature of the present invention is that the sealing of the transversely extending walls 15 and 21 takes place, annularly, at the straight or cross-sectionally flat inside wall surface 67 of the depending annular wall 59 of the upper electrode 55. This is in marked contrast to the prior art techniques of sealing at opposed horizontally disposed electrode surfaces or at an arcuate surface.

The technique and procedure by which the seal is executed will be described with reference to FIGURES 2, 3 and 4. In a preferred embodiment of the invention, the upstanding columnar wall 15 of plastic material is an encapsulated gusset assembly which comprises an envelope of an outer plastic cover 71 and an inner plastic liner 75, the cover and liner being sealed to each other at registering peripheral edges and enclosing a chip board 77 or equivalent bodying element therebetween. The gusset is looped and the ends are joined to each other to define a columnar wall.

The spanning sheet 21 or plastic sheet comprises an outer plastic cover 81 and a plastic liner 83 of corresponding contours and sealed to each other at peripheral edges to encapsulate or enclosure a first stiffener member 85 of chip board or the like and a second board 87 substantially coextensive with the first board but of somewhat reduced lateral expanse so that the first board 85 extends slightly beyond the periphery of the second board 87. A sheet or layer of soft resilient foam of sponge rubber, urethane, or an equivalent may be used on top of the first board as padding means. An exploded view of the top electrode or sealing dish, the encapsulated top member or sheet 21, the gusset or columnar wall 15 and the lower electrode or canister 35 in their relative spatial positions prior to location for sealing is provided schematically in FIGURE 3.

In preparation for executing the electronic seal in the fabrication of the open ended receptacle 11, the encapsulated gusset or upstanding columnar wall 15 is slidably positioned over the canister assembly or lower electrode 35 to bring the top platen 45 into firm radial engagement with the upper peripheral portion of the upstanding columnar wall 15, as illustrated in FIGURE 4. The spanning plastic sheet or wall 21 is then placed in position on top of the canister assembly or lower electrode to bring the border of the spanning sheet 21 in substantial correspondence or registry with the upper edge of the upstanding columnar wall 15. The sealing dish or upper electrode 55 is then brought downwardly to cover the spanning sheet 21 and to urge the spanning sheet 21 toward the columnar wall. At the same time, the vertically extending portion or the straight wall flange 59 of the upper electrode 55 confines the peripheral edge portion of the encapsulated spanning sheet 21 and brings the edge portion into positive vertical abutment with the upper peripheral edge 17 of the upstanding gusset wall 15, as shown in FIGURES 2 and 4. Concurrently, in a preferred procedure, an extreme circumambient flap 89 portion of the spanning sheet formed by swaging action of the top electrode on the periphery of the plastic sheet 21 is urged into lateral abutment against to overlie slightly the outer surface of the top edge portion of the upstanding gusset member 15. In the particular embodiment of the invention illustrated, the top stiffening member 85 seats upon and is supported by the columnar wall 15 and the second board 87 nests within the columnar wall 15 in circumferential engagement therewith.

High frequency heating and sealing current is applied between the upper 55 and the lower 35 electrode through conductor connections 91 and 95 illustrated schematically in FIGURE 4. Fusion occurs at the contacting edge portions of the registering spanning wall and the upstanding columnar wall and a smooth strong bond is achieved (FIGURE 2). In the final tray-like element, as illustrated in FIGURE 1, the fusion seal between the spanning sheet 21 and the upstanding wall 15 is at the side wall portion of the open container rather than at a corner junction. This improved construction provides a smooth uninterrupted surface at the wear corners and a stronger bond between the two transversely extending walls of the tray-like element. To complete the container or carrying case, a second tray-like element 99 is fabricated in the manner described above and attached to the first element in any preferred manner, well known to those skilled in the relevant art.

In a second preferred embodiment of the invention, as shown in FIGURE 5, the upper electrode 101 comprises a dish-like sealing member having a top plate 103 and a depending peripheral flange 105. The inside surface of the flange extends vertically upwardly to define a sealing face 109 substantially straight in cross section and terminating at a step 111 having a generally horizontal surface 113 intersecting the vertical sealing surface 109 and extending transversely thereof. At its inside radial limit, the step 111 forms a vertically extending receding shoulder 115 blending into the generally flat underside 119 of the top plate 103, so that in the sealing operation there is a physical separation or spacing between the top plastic surface 81 of the spanning thermoplastic sheet assembly 21 and the upper electrode 101 over substantially the entire expanse of the sheet, the electrode 101 contacting the sheet 21 only at its periphery, at the top and side surfaces. So disposed, the top electrode urges the spanning wall 21 into stressed vertical abutment and lateral alignment with the coextensive registering edge 17 of the upstanding columnar wall 15 of the receptacle 11 preparatory to applying sealing current between the top 101 and the bottom 35 electrodes to fuse the abutting edges of the upstanding and the spanning walls. As illustrated schematically in FIGURE 5, the seal is formed at the vertically disposed sealing face 109 of the top electrode 101.

Still another preferred embodiment of the upper sealing electrode is illustrated in FIGURE 6. The electrode 131 is generally of the same over-all physical form of the electrode 101 depicted in FIGURE 5 except in the peripheral portion of the under surface of the electrode which engages and presses against the top edge of the spanning plastic wall 21. The modified electrode 131 is provided with a circumferential groove or slot 135 which carries a non-metallic ring or band 139 of plastic, rubber, or the like. The lower surface 141 of the band insert 139 extends somewhat below the principal lower face 143 of the electrode 131 so that, when brought downwardly to urge the spanning wall 21 against the upstanding columnar wall 15, only the ring 139 engages the top surface of the spanning wall. Since the ring 139 is of a material substantially less responsive to high frequency radiation energy to become heated, fusion, deformation, or marring of the top peripheral portion of the spanning wall 21 are obviated and fusion is restricted to the plastic edges contacting the vertical wall portion 145 of the upper electrode 131.

While this invention has been described with reference to specific embodiments, it will be understood by those skilled in the art that numerous modifications and changes may be made within the true spirit and scope of the invention as described in the following claims.

What is claimed is:

1. Apparatus for heat sealing a free marginal edge of an upstanding columnar wall of thermoplastic sheet material to a coextensive abutting peripheral edge of an overlying thermoplastic sheet-like top wall spanning said columnar wall and having a marginal contour corresponding to the cross sectional configuration of said columnar wall at said free edge thereof to form a fused substantially smooth butt joint between corresponding contiguous abutting and registering edge portions of said columnar wall and said top wall, and to provide a unitary open-ended container;

said apparatus comprising cooperating inner and outer electrodes of a high frequency electronic plastic welding circuit, and means to apply high frequency current to said electrodes;

said inner electrode defining a cannister having horizontally extending vertically spaced parallel upper and lower platens and a vertical wall extending therebetween and radially inwardly of said columnar wall of said thermoplastic sheet material extending therearound;

said outer electrode comprising an inverted dish including a depending marginal flange having a vertically extending inner annular face which is flat in section;

said outer flat faced electrode disposed in use to overlie and span said upper platen of said inner electrode to provide a restricted substantially constant annular spacing between said inner annular face of said depending marginal flange and a peripheral bounding edge of said upper platen;

said vertically extending inner face of said depending marginal flange of said outer electrode spaced radially with respect to said peripheral bounding edge of said upper platen of said inner electrode to confine said columnar wall of said thermoplastic sheet material therebetween; and means to press said upper electrode against said top wall of thermoplastic material to bring a peripheral edge portion of said top wall into pressured abutting contact with a terminal edge portion of said columnar wall to fuse said abutting edge portions together in response to sealing pressure and heat applied upon actuation of said high frequency current-applying means.

2. The apparatus of claim 1 wherein said upper platen of said inner electrode is cut away at its outer edge portion to provide an upwardly diverging annular surface and a well-defined bounding edge substantially wedge-shaped in cross-section.

3. The apparatus of claim 1 and further comprising a pressure ring of a plastic-type composition and having a substantially flat lower pressure transmitting surface, said ring being retained in a groove formed inwardly of an under surface of said outer electrode adjacent and radially inwardly of said vertically extending inner face thereof, said ring adapted to press downwardly against a circumambient peripheral portion of said top wall of said thermoplastic material during fusion joinder of said abutting edge portions of said top wall and said columnar wall, said ring obviating development of excessive heat at a top surface of said peripheral portion of said top wall and effective to restrict fusion to said abutting edge portions of said top and columnar walls.

4. Apparatus for heat sealing a free marginal edge of an upstanding columnar wall of thermoplastic sheet material to a coextensive abutting peripheral edge of an overlying thermoplastic sheet-like top wall spanning said columnar wall and having a marginal contour corresponding to the cross sectional configuration of said columnar wall at said free edge thereof to form a fused substantially smooth butt joint between corresponding contiguous abutting and registering edge portions of said columnar wall and said top wall, and to provide a unitary open-ended container;

said apparatus comprising cooperating inner and outer electrodes of a high frequency electronic plastic welding circuit, and means to apply high frequency current to said electrodes;

said inner electrode defining a canister having horizontally extending vertically spaced parallel upper and lower platens and a vertical wall extending therebetween and radially inwardly of said columnar wall of said thermoplastic sheet material extending therearound;

said outer electrode comprising an inverted dish including a horizontal platen and a depending marginal flange;

a corner forming element integral with said platen and said flange and having a vertical circumambient sealing surface intersecting a substantially planar horizontal pressure surface;

said horizontal pressure surface forming with said vertical surface a circumambient corner means for confining said abutting and registering edge portions of said plastic columnar and top walls during fusion sealing thereof; and means to urge said upper electrode against said spanning wall of thermoplastic sheet material to bring said registering edge portions of said spanning wall and said columnar wall into continuous contact to fuse said edge portions together in response to sealing pressure and heat applied upon actuation of said high frequency current-applying means.

5. The method of fabricating an open-ended box-like receptacle constituting a component of a luggage-type case and including an upstanding thermoplastic columnar wall and a substantially flat thermoplastic sheet-like top wall overlying said columnar wall and having a marginal contour corresponding to the cross-sectional configuration of said columnar wall, said method comprising the steps of:

spatially orienting said columnar wall to encompass in circumambient relationship a horizontally disposed plate-like first electrode and to contact therearound a side edge of said plate-like electrode adjacent a concentric top peripheral edge of said columnar and inwardly thereof;

placing a second electrode comprising an inverted dish having a depending rim portion including an inner annular sealing face of a vertically straight contour to present said face to said marginal edge of said top wall and to said adjacent peripheral edge of said columnar wall and to urge said face thereagainst to bring said marginal edge of said top wall into positive superimposed contiguous stressed contact with said peripheral edge of said columnar wall; and impressing high frequency electrical energy between said first and said second electrodes and through contiguous abutting end portions of said top wall and said columnar wall for a period of time sufficient to fuse said end portions to provide a high strength substantially flat continuous joinder between said top and said columnar wall.

6. The method of claim 5 and including the step wherein said inner annular sealing face of said second electrode swages a marginal thermoplastic lip portion of said top wall downwardly into stressed and partially overlapping contact with said peripheral edge of said columnar wall to provide a flat circumambient side seam in the area of joinder of said top wall and said columnar wall, said seam being displaced vertically from a plane defined by a top surface of said top wall.

References Cited
UNITED STATES PATENTS

| | | | |
|---|---|---|---|
| 2,259,256 | 10/1941 | Maas et al. | 156—69 |
| 2,413,449 | 12/1946 | Hatch | 156—69 |
| 3,142,601 | 7/1964 | Polk et al. | 156—273 |

DOUGLAS J. DRUMMOND, *Primary Examiner.*